(12) United States Patent
Yonezawa et al.

(10) Patent No.: US 6,455,635 B1
(45) Date of Patent: Sep. 24, 2002

(54) HYDROGENATED BLOCK COPOLYMER

(75) Inventors: Jun Yonezawa; Shinichi Sekikawa, both of Yokohama; Hiromi Nakafutami, Kawasaki; Takashi Sato, Yokohama, all of (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/554,310

(22) PCT Filed: Sep. 13, 1999

(86) PCT No.: PCT/JP99/04988

§ 371 (c)(1),
(2), (4) Date: May 12, 2000

(87) PCT Pub. No.: WO00/15681

PCT Pub. Date: Mar. 23, 2000

(30) Foreign Application Priority Data

Sep. 14, 1998 (JP) ............................................. 10-259667

(51) Int. Cl.$^7$ ........................ C08F 297/00; C08L 53/02; C08L 23/10
(52) U.S. Cl. ........................... 525/88; 525/314; 525/316
(58) Field of Search ............................. 525/88, 98, 314, 525/316; 526/79

(56) References Cited

U.S. PATENT DOCUMENTS

| | | | |
|---|---|---|---|
| 4,386,125 A | 5/1983 | Shiraki et al. | |
| 5,189,110 A | 2/1993 | Ikematu et al. | |
| 5,358,986 A | 10/1994 | Onofusa et al. | |
| 6,239,218 B1 * | 5/2001 | Yonezawa et al. | ............ 525/98 |

FOREIGN PATENT DOCUMENTS

| | | |
|---|---|---|
| DE | 19815895 A1 | 10/1998 |
| EP | A1173380 | 3/1986 |
| EP | 0263678 A2 | 4/1988 |
| JP | 61-155446 * | 7/1986 |
| JP | A912804 | 1/1997 |
| WO | WO9731977 A1 | 9/1997 |

OTHER PUBLICATIONS

Patent Abstract of Japan 61 155446A, Jul. 15, 1986.

* cited by examiner

Primary Examiner—Jeffrey Mullis
(74) Attorney, Agent, or Firm—Birch, Stewart, Kolasch & Birch, LLP

(57) ABSTRACT

A hydrogenated block copolymer which comprises at least two polymer blocks A each mainly comprising an aromatic vinyl hydrocarbon compound monomer unit and at least two hydrogenated polymer blocks B each mainly comprising a butadiene monomer unit, at least 90% of the olefinically unsaturated double bonds in said polymer block mainly comprising a butadiene monomer unit before hydrogenation having been hydrogenated, wherein at least one of the block at the terminal of the hydrogenated block copolymer is the polymer block B, wherein the proportion of the terminal polymer blocks B in the hydrogenated block copolymer is at least 0.1 wt % but less than 9.1 wt %, wherein the proportion of the aromatic vinyl hydrocarbon compound in the hydrogenated block copolymer exceeds 10 wt % but less than 25 wt %, wherein the 1,2-bond content of the polymer blocks mainly comprising a butadiene monomer unit before hydrogenation is, on average, at least 62 mole % but less than 99 mol %, and wherein the difference ΔTc (Tc1–Tc2) between the crystallization initiating temperature (Tc1) of the isotactic homopolypropylene and the crystallization initiating temperature (Tc2) of a mixture thereof with the hydrogenated block copolymer is at least 1.5° C.

5 Claims, 1 Drawing Sheet

HYDROGENATED BLOCK COPOLYMER

This application is the national phase under 35 U.S.C. § 371 of PCT International Application No. PCT/JP99/04988 which has an International filing date of Sep. 13, 1999, which designated the United States of America.

TECHNICAL FIELD

The present invention relates to a hydrogenated block copolymer having a specific structure; and to a polypropylene resin composition which comprises a polypropylene resin and the hydrogenated block copolymer having a specific structure, which composition is improved in the balance among flexibility, stress-whitening property, haze and film blocking property by the incorporation of the hydrogenated block copolymer.

BACKGROUND ART

Since polypropylene resin compositions are generally excellent in chemical resistance and mechanical properties, they are used widely for packing materials, sundries, machine parts, automobile parts and the like. In addition, development of halogen-free transparent polymer materials has recently been carried out briskly, forced by the necessity for environmental protection. There is a demand for development of flexible and transparent polypropylene resins particularly in the fields of sheets or films. It is the common practice to add an elastomer to a polypropylene resin in order to make the resin flexible and transparent. By the addition of an olefin type elastomer to a polypropylene resin, flexibility can be improved, however, the stress-whitening property and haze are not satisfactory.

In JP-A-61-155446 (the term "JP-A" as used herein means an "unexamined published Japanese patent application), claimed is a composition comprising a hydrogenated block copolymer having a predetermined number-average molecular weight, a predetermined amount of styrene and a predetermined amount of a hydrogenated polybutadiene block at the terminal of the copolymer; and a polyolefin and examples using a styrene-hydrogenated polybutadiene-styrene-hydrogenated polybutadiene block copolymer or a hydrogenated polybutadiene-styrene-hydrogenated polybutadiene-styrene-hydrogenated polybutadiene block copolymer having at the terminal thereof a hydrogenated polybutadiene block in an amount of 1.3, 2.5, 3, 5, 6.7, 10, 20 or 40 wt % are described. In the specification, it is described how the amount of the terminal hydrogenated polybutadiene block influences on the mechanical strength or rubber elasticity of the composition. It does not include an example using a hydrogenated block copolymer having a terminal hydrogenated polybutadiene block wherein the average of 1,2-bond amount, before hydrogenation, of a polymer block mainly comprising a butadiene monomer falls within a range of at least 62 mol % but less than 99 mol %. The publication includes neither a description nor suggestion concerning the structure of the hydrogenated block copolymer and an improvement in the balance among flexibility, stress-whitening property, haze, film blocking property brought by the addition of the hydrogenated block copolymer to a polypropylene resin.

In JP-A-6-287365, a composition comprising polypropylene and a hydrogenated diene copolymer is proposed with a view to improving the stress-whitening property. The film obtained by this process, however, is accompanied with such a problem as a deterioration in blocking property between the obtained films and an improvement is demanded. The film is also unsatisfactory in flexibility and haze.

An object of the present invention is to provide a polypropylene resin composition well-balanced in flexibility, stress-whitening property, haze and film blocking property and also a hydrogenated block copolymer for obtaining the composition.

DISCLOSURE OF THE INVENTION

With a view to attaining the above-described objects, the present inventors have carried out an extensive investigation. As a result, it has been found that a resin composition comprising a hydrogenated block copolymer having a specific structure and a polypropylene resin effectively attains the above-described objects, leading to the completion of the present invention.

The above-described object of the present invention is attained by the following hydrogenated block copolymers and resin composition.

1. A hydrogenated block copolymer which comprises at least two polymer blocks A each mainly comprising an aromatic vinyl hydrocarbon compound monomer unit and at least two hydrogenated polymer blocks B each mainly comprising a butadiene monomer unit, at least 90% of the olefinically unsaturated double bonds in said polymer block mainly comprising a butadiene monomer unit before hydrogenation having been hydrogenated, wherein at least one of the block at the terminal of the hydrogenated block copolymer is the polymer block B, wherein the proportion of the terminal polymer blocks B in the hydrogenated block copolymer is at least 0.1 wt % but less than 9.1 wt %, wherein the proportion of the aromatic vinyl hydrocarbon compound in the hydrogenated block copolymer exceeds 10 wt % but less than 25 wt %, wherein the 1,2-bond content of the polymer blocks mainly comprising a butadiene monomer unit before hydrogenation is, on average, at least 62 mol % but less than 99 mol %, and wherein the difference $\Delta Tc$ (Tc1–Tc2) between the crystallization initiating temperature (Tc1) of the isotactic homopolypropylene and the crystallization initiating temperature (Tc2) of a mixture thereof with the hydrogenated block copolymer is at least 1.5° C.

2. The hydrogenated block copolymer according to the above embodiment 1, wherein the proportion of the aromatic vinyl hydrocarbon compound in the hydrogenated block copolymer is at least 12 wt % but less than 25 wt %.

3. The hydrogenated block copolymer according to the above embodiment 1, wherein $\Delta Tc$ (Tc1–Tc2) is at least 2.0° C.

4. The hydrogenated block copolymer according to the above embodiment 1, wherein the proportion of the terminal polymer block B in the hydrogenated block copolymer exceeds 0.5 wt % but less than 5.0 wt %.

5. A resin composition comprising the following components (1) and (2):

(1) 5 to 99 parts by weight of a polypropylene resin, and (2) 1 to 95 parts by weight of a hydrogenated block copolymer according to any one of the above embodiments 1 to 4.

The present invention also relates to a sheet and film comprising the above-described resin composition.

BEST MODE FOR CARRYING OUT THE INVENTION

Figure 1:
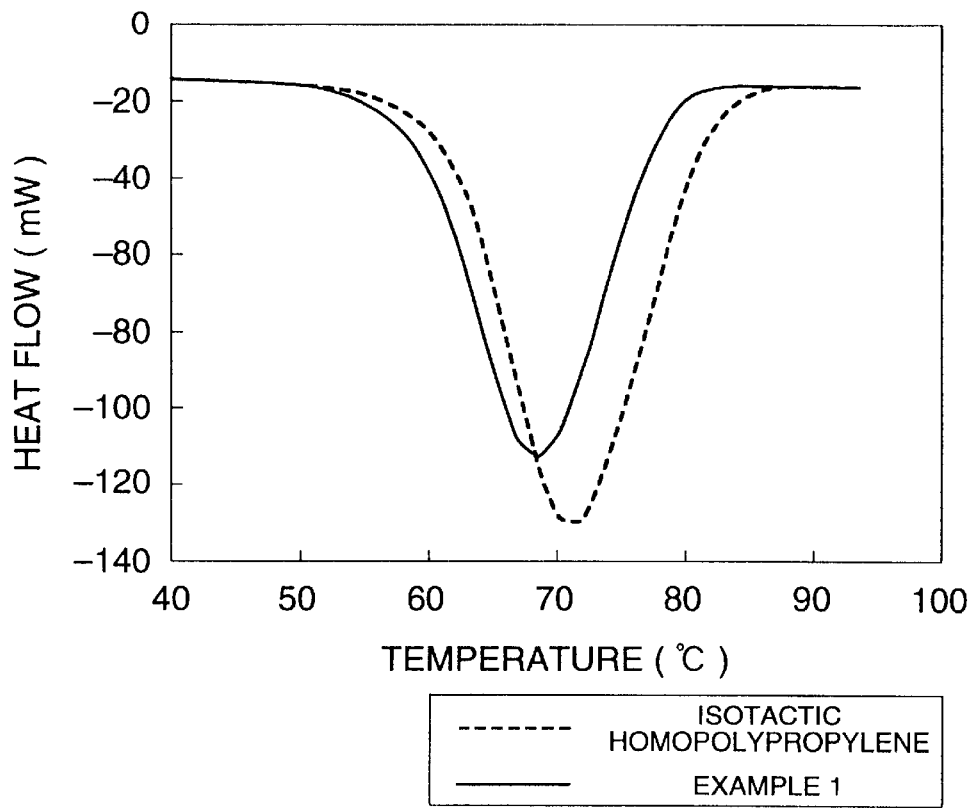
FIG. 1 illustrates crystallization curves of the composition according to Example 1 and of isotactic homopolypropylene.
Figure 2:
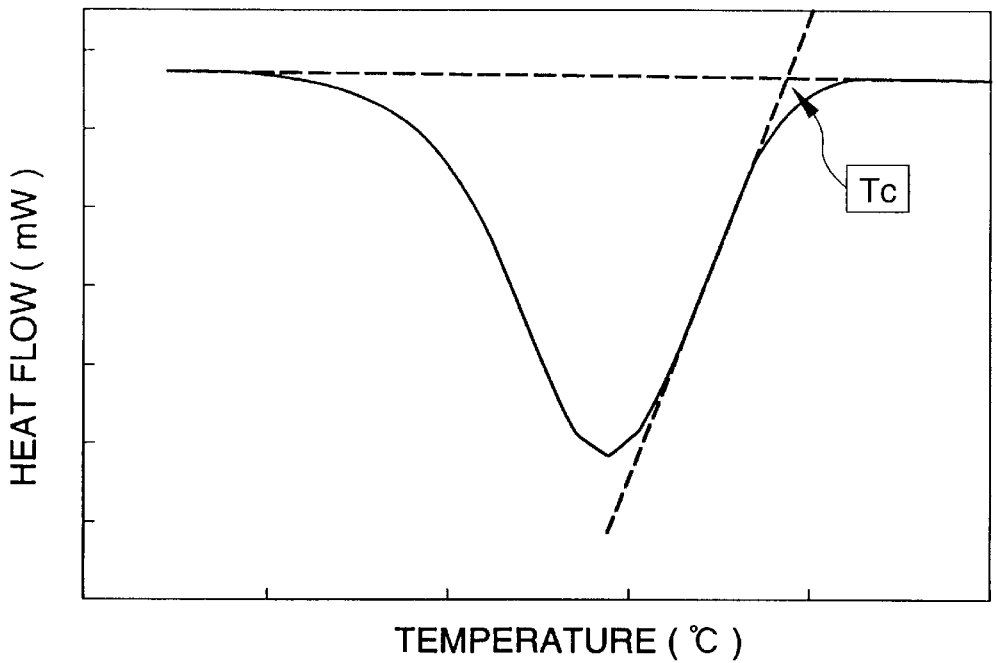
FIG. 2 illustrates a method for determining the crystallization initiating temperature (Tc) using a crystallization curve.

The present invention will hereinafter be described more specifically. The present invention has been made based on the findings that a composition comprising a polypropylene resin and a hydrogenated block copolymer acquires excellent balance among flexibility, stress-whitening property, haze and film blocking property, when the content of an aromatic vinyl compound monomer unit in the hydrogenated block copolymer, a 1,2-bond content in a polymer block mainly comprising butadiene monomer units before hydrogenation, and a difference ΔTc (Tc1–Tc2) between the crystallization initiating temperature (Tc1) of the isotactic homopolypropylene and the crystallization initiating temperature (Tc2) of a mixture thereof with the hydrogenated block copolymer, each falls within a predetermined range, and at the same time, the copolymer has a specific block structure.

As means for imparting the polypropylene resin with flexibility, it can be considered lowering in the elastic modulus of the hydrogenated block copolymer itself by decreasing the content of the aromatic vinyl compound monomer unit in the hydrogenated block copolymer or by lowering the molecular weight (raising MFR). In this case, however, it is difficult to form a sheet or film with uniform width and even if such a formed product can be obtained, the sheet or film adhere to another sheet or film upon storage (film blocking property is deteriorated), which prevents smooth secondary processing. The present inventors have found that when the hydrogenated block copolymer has, at the terminal thereof, a specific amount of a hydrogenated polymer block mainly comprising a butadiene monomer unit, balance between flexibility imparting effects and film blocking property can be improved, within a predetermined range of the content of the aromatic vinyl compound monomer unit, without lowering the molecular weight.

The stress-whitening property and haze are presumed to be improved by fine dispersion of the domain of the polymer block, which comprises the aromatic vinyl hydrocarbon compound monomer unit, in the polypropylene resin composition. For the fine dispersion, it is effective to decrease the content of the aromatic vinyl compound monomer unit or lower the molecular weight (to raise MFR), which however deteriorates the film blocking property. Finding that when the 1,2-bond content in the polymer block mainly comprising the butadiene monomer unit before hydrogenation falls within a predetermined range and the hydrogenated block copolymer has, at the terminal thereof, a specific amount of a hydrogenated polymer block mainly comprising a butadiene monomer unit, the cohesion of the polymer block mainly comprising the aromatic vinyl hydrocarbon monomer unit lowers, leading to markedly fine dispersion in the polypropylene resin, the present inventors have succeeded in the improvement of stress-whitening property and haze of the polypropylene resin composition.

As described above, the present inventors have found that the balance of a polypropylene resin among flexibility, stress-whitening property, haze and film blocking property can be highly improved by adjusting, in a composition comprising the polypropylene resin and a hydrogenated block copolymer, the content of the aromatic vinyl compound monomer unit of the hydrogenated block copolymer and the 1,2-bond content of the polymer block mainly comprising a butadiene monomer unit before hydrogenation to fall within predetermined ranges and incorporating, to the terminal of the hydrogenated block copolymer, a specific amount of a hydrogenated polymer block mainly comprising a butadiene monomer unit.

As the polypropylene resin (1) usable in the present invention, any resin available by homopolymerization of propylene or polymerization of propylene with at least one monomer selected from ethylene and $C_{4-12}$ α-olefins, for example, 1-butene, isobutylene and 4-methyl-1-pentene can be used. Among them, a homopolymer of propylene, propylene block copolymers and propylene random copolymers and mixtures thereof are preferred. The polymer different in the molecular weight or composition can also be mixed. The polypropylene resin having any stereoregularity such as isotactic, syndiotactic and atactic form can be used. As a comonomer of the block or random copolymer with propylene, α-olefins other than propylene and ethylene can be employed, of which the ethylene is preferred. The propylene content in such a copolymer is preferably at least 55 mol %. in the propylene block copolymer obtained using an α-olefin as a comonomer, an ethylene/α-olefin block forms a disperse phase with a homopropylene block as a continuous phase. The content of the disperse phase component is preferably 5 to 30 wt % of the propylene block copolymer. This disperse phase may contain polyethylene. In the present invention, the melt flow rate (in accordance with the conditions specified in JIS K7210L) of the polypropylene resin preferably falls within a range of 0.1 to 200 g/10 min. The polyolefin resin can be polymerized in any known manner and examples include transition polymerization, radical polymerization and ion polymerization.

The hydrogenated block copolymer (2) usable in the present invention comprises at least two polymer blocks mainly comprising an aromatic vinyl hydrocarbon compound unit and at least two hydrogenated polymer blocks B mainly comprising a butadiene monomer unit. As the aromatic vinyl compound monomer unit, at least one is selected from styrene, alkyl styrenes such as α-methylstyrene, p-methylstyrene and p-tertiary butyl styrene, paramethoxy styrene and vinyl naphthalene, of which the styrene is preferred. The block copolymer contains the aromatic vinyl compound monomer unit in an amount exceeding 10 wt % but less than 25 wt %. From the viewpoints of film blocking property, flexibility and haze, amounts of at least 12 wt % but less than 25 wt % are preferred. Amounts not greater than 10 wt % deteriorate film blocking property, while those of 25 wt % or greater deteriorate flexibility and haze. The content of the aromatic vinyl compound monomer unit can be measured by a nuclear magnetic resonance (NMR) apparatus or ultraviolet spectrophotometer (UV). When the terms "mainly comprising", for example, in the case of "mainly comprising an aromatic vinyl compound monomer unit", means to include the case where the block comprises one or more aromatic vinyl monomers and also includes the case where the aromatic vinyl monomer has been copolymerized with another monomer copolymerizable therewith by living anionic polymerization. Examples of the another monomer copolymerizable with the aromatic vinyl monomer(s) include conjugated diene compound monomers, methacrylates such as methyl methacrylate and butyl methacrylate, cyclohexadiene and caprolactone. They may be copolymerized in any form such as random, alternate and tapered. A plurality of polymer blocks A may differ in composition or molecular weight from one another.

In the present invention, the 1,2-bond content of the polymer block mainly comprising a butadiene monomer unit before hydrogenation is, on average, at least 62 mol % but less than 99 mol %, with the content of at least 65 mol % but less than 99 mol % being preferred and that of at least 70 mol % but not greater than 99 mol % being more preferred. Contents less than 62 mol % deteriorate stress-whitening property and haze. The micro structure can be measured by a nuclear magnetic resonance (NMR) apparatus. The terms "mainly comprising a butadiene monomer unit" mean to include the case wherein butadiene has been copolymerized with another monomer copolymerizable therewith by living anionic polymerization. Examples of the another monomer copolymerizable with butadiene include aromatic vinyl compound monomers, methacrylates such as methyl methacrylate and butyl methacrylate, cyclohexadiene and caprolactone. They may be copolymerized in any form such as random, alternate and tapered. A plurality of the polymer blocks B may differ in composition or molecular weight from one another.

The terms "mainly comprising" as used herein mean that the corresponding monomer unit is contained in the polymer block in an amount exceeding 50 mol %, preferably, at least 70 mol %.

The hydrogenated block copolymer of the present invention is obtained by hydrogenation of at least 90% of the olefinically unsaturated double bonds in the polymer block B before hydrogenation. Hydrogenation ratios less than 90% cause a deterioration by heat or light, leading to lowering in the thermoplasticity. The unsaturated double bonds of the benzene ring of the aromatic vinyl compound in the block A may be hydrogenated in an amount up to 20% based on the whole aromatic vinyl compound. These hydrogenation ratios can be measured by a nuclear magnetic resonance (NMR) apparatus.

The melt flow rate (MFR) of the hydrogenated block copolymer determined in accordance with JIS K 7210 under the conditions of a temperature of 230° C. and a load of 2.16 Kg preferably falls within a range of at least 0.01 g/10 min but less than 50 g/10 min, with a range of at least 1.0 g/10 min but not greater than 14 g/10 min being more preferred and a range of at least 2.0 g/10 min but not greater than 6.0 g/10 min being particularly preferred. Melt flow rates less than 0.01 g/10 min deteriorate the fluidity of the composition, while those of 50 g/10 min or greater deteriorate the film blocking property. Those outside the above-described range are therefore not preferred.

In the present invention, although the hydrogenated block copolymer can take any form such as linear, branched, radial or comb-like form, it should comprises at least two polymer blocks mainly comprising an aromatic vinyl hydrocarbon compound monomer unit and at least two hydrogenated polymer blocks B mainly comprising a butadiene monomer unit. In addition, the hydrogenated block copolymer of the present invention must have, as at least one terminal block, the polymer block B. Preferred structures include A-B-A-B, B-A-B-A-B and (B-A-B)$_n$-X (wherein n stands for an integer of 2 or greater and X represents the residue of a coupling agent). When random copolymerization is taken place at the boundary of each block, its structure may be a tapered one in which its composition gradually changes.

The proportion of each of the terminal polymer block(s) B in the hydrogenated block copolymer is at least 0.1 wt % but less than 9.1 wt %. From the viewpoints of flexibility, stress-whitening property, haze and film blocking property, proportions of at least 0.3 wt % but not greater than 7.5 wt % are preferred, with proportions exceeding 0.5 wt % but less than 5.0 wt % being more preferred. Ratios less than 0.1 wt % deteriorate flexibility, stress-whitening property and haze, while those of 9.1 wt % or greater deteriorate film blocking property. When the hydrogenated block copolymer is in the form of A-B-A-B, for example, the proportion of the terminal polymer block B in the whole copolymer is at least 0.1 wt % but less than 9.1 wt %. When the hydrogenated block copolymer is in the form of B1-A-B2-A-B3 (B1, B2 and B3: hydrogenate polymer blocks mainly comprising a butadiene monomer unit), the proportion of the terminal polymer block B1 must fall within a range of at least 0.1 wt % but less than 9.1 wt % and that of the polymer block B3 at the other terminal must also fall within a range of at least 0.1 wt % but less than 9.1 wt %.

When the hydrogenated block copolymer of the present invention is added in an amount of 20 wt % to isotactic homopolypropylene, the crystallization initiating temperature of the isotactic homopolypropylene must be lowered by at least 1.5° C. (in other words, the difference ΔTc (Tc1−Tc2) between the crystallization initiating temperature of the isotactic homopolypropylene (Tc1) and that of the hydrogenated block copolymer of the present invention (Tc2) must be 1.5° C. or greater). ΔTc is preferably at least 2° C., more preferably 2.5° C. and particularly preferably at least 3.0° C. When the ΔTc is less than 1.5° C., the stress-whitening property becomes poor.

The hydrogenated block copolymer falling within the scope of the present invention can be prepared by the process described in, for example, JP-B-36-19286 (the term "JP-B" as used herein means an "examined published Japanese patent publication"), JP-B-43-14979 or JP-B-49-36957. According to the above-described process, an aromatic vinyl monomer and a butadiene monomer are subjected to block copolymerization in a hydrocarbon solvent by using an organic lithium compound as an anionic polymerization initiator and, as a vinylating agent, an ether compound such as diethyl ether, tetrahydrofuran, anisole or dioxane or a tertiary amine such as triethylamine or N,N,N',N'-tetramethylethylenediamine, and if necessary, a polyfunctional compound such as epoxylated soybean oil, silicon tetrachloride, dimethyldichlorosilane, ethyl benzoate or phenyl benzoate as a coupling agent. By the above-described process, a block copolymer having a linear, branched or radial structure can be obtained.

The hydrogenated block copolymer of the present invention can be obtained by the hydrogenation of the above-described block copolymer by a known process, for example, the process described in JP-B-42-87045. The hydrogenated block copolymer usable in the present invention may partially or entirely contain that modified by the addition reaction with an unsaturated carboxylic acid or derivative thereof to have a functional group. It can be used in combination with a hydrogenated block copolymer having a different composition, or an olefin base elastomer such as ethylene propylene copolymer or ethylene octene copolymer.

To the hydrogenated block copolymer of the present invention, which is in the form of pellets, a pellet blocking preventive can be added, if necessary, to prevent blocking of the pellets. Examples of the pellet blocking preventive include calcium stearate, magnesium stearate, zinc stearate, ethylene bis-stearamide, talc, amorphous silica and metallic soap.

The resin composition of the present invention can be adjusted according to the ratio of each component by an apparatus ordinarily employed for the mixing of a high-molecular weight substance. Examples of such a kneader include Banbury mixer, Labo Plasto mill, single-screw extruder and twin-screw extruder. Mixing under a molten state by an extruder is preferred from the viewpoints of the productivity and good kneading properties. The resin composition of the present invention can be formed into a sheet or film by an extruder, or into an injection molded product by an injection molder.

The resin composition of the present invention is a composition comprising (1) 5 to 99 parts by weight of a polypropylene resin and (2) 1 to 95 parts by weight of a hydrogenated block copolymer. When the amount of the hydrogenated block copolymer is less than 1 part by weight, the resulting resin composition is inferior in flexibility. When the amount exceeds 95 parts by weight, on the other hand, the resulting composition is inferior in film blocking property.

To the composition of the present invention, an inorganic filler, stabilizer, lubricant, colorant, silicone oil, flame retardant and/or the like can be added. Examples of the inorganic filler include calcium carbonate, talc, magnesium hydroxide, mica, barium sulfate, silicic acid (white carbon), titanium oxide and carbon black. Those of the stabilizer include hindered phenol antioxidants, phosphorus base heat stabilizers, hindered amine base light stabilizers and benzotriazole base UV absorbers. Examples of the lubricant include stearic acid, stearates and metal salts of stearic acid.

The present invention will hereinafter be described in detail. It should however be borne in mind that the present invention is not limited by these examples.

EXAMPLES (I) Each Component
(1) Polypropylene Resin

A propylene homopolymer (isotactic homopolypropylene) "PC600S" (MFR 7 g/10 min) produced by Nippon Polyolefin Co., Ltd. and a propylene random copolymer "FG464" (MFR 7 g/10 min) produced by Nippon Polyolefin Co., Ltd. were employed.

(2) Hydrogenated Block Copolymer

A styrene-butadiene block copolymer was obtained by anionic block copolymerization of styrene and butadiene in a solvent of cyclohexane by using n-butyl lithium as an initiator and tetrahydrofuran as a 1,2-bond amount regulator. Then, the resulting styrene-butadiene block copolymer was hydrogenated under a hydrogen pressure of 5 Kg/cm$^2$ and a temperature of 50° C. by using bis($\eta^5$-cyclopentadienyl) titanium dichloride and n-butyl lithium as a hydrogenation catalyst. The structure, molecular weight, 1,2-bond amount, hydrogenation ratio and $\Delta$Tc of the polymer were controlled by changing the amount and order of the monomer charged, the amount of the catalyst, the amount of the 1,2-bond amount regulator and polymerization temperature, the hydrogenation time, and the 1,2-bond amount and molecular weight, respectively. The styrene content was measured by a ultraviolet spectrophotometer (UV), while the 1,2-bond amount and hydrogenation ratio were each measured by a nuclear magnetic resonance (NMR) apparatus.

The structure and analysis data of each sample are shown in Table 1.

(II) Adjustment of Resin Compositions and Measurement of Their Physical Properties A film and sheet for measurement were prepared by dry blending of the component (1) with the component (2), each in the form of pellets, at a ratio as shown in Table 2 and then forming by a 30 mm T-die single screw extruder set at 230° C. The thickness of the sheet or film was adjusted by changing the rotational number of the screw and take-up speed. In a similar manner, a film was prepared by using only isotactic homopolypropylene of the component (1) and a film was prepared by adding 20 wt % of SEBS5 to the isotactic homopolypropylene. In Table 1, $\Delta$TC of the resulting film or sheet after storage at room temperature for 1 week is shown, while in Table 2, measuring results of the physical properties are shown.

A description will next be made of a method for measuring physical properties.

$\Delta$TC: The crystallization initiating temperature (Tc) was determined using "7 Series Thermal Analysis System (DSC)" of Perkin-Elmer Corporation by heating the film or sheet from room temperature to 200° C. at a heating rate of 10° C./min, maintaining the temperature at 200° C. for 5 minutes, and measuring the crystallization curve at a cooling rate of 100° C./min. A method to determine the crystallization initiating temperature (Tc) from the crystallization curve is shown in Table 2. After determination of an average value of three-time measurements wherein three different samples for the same composition were employed, the difference $\Delta$Tc (Tc1−Tc2) in the crystallization initiating temperature (Tc1) of the isotactic homopolypropylene and the crystallization initiating temperature (Tc2) of a mixture thereof with a hydrogenated block copolymer was calculated. The crystallization curves of the composition of Example 1 and isotactic homopolypropylene are shown in FIG. 1.

MFR: measured in accordance with the conditions specified in JIS K7210 L.

Young's modulus (standard for flexibility): The Young's modulus (strain within a range of 0.5% to 1.0%) of the sheet or film cut into a test piece of 70 μm thick, 20 mm wide and 100 mm long was measured at a stress rate of 2 mm/min.

Stress-whitening property: To a sheet of 0.4 mm thick, a missile of ½ inch in diameter was dropped under the conditions of a load of 0.5 Kg and height of 30 cm and the whole light transmittances before and after dropping were measured.

$\Delta T\%$=whole light transmittance $T1$ (%) before dropping of a missile−whole light transmittance $T2$ (%) after dropping of a missile The smaller $\Delta T$ %, the better the stress-whitening property.

Haze: The haze of a film of 70 μm thick was measured by a haze meter.

Film blocking property: After blocking of a film cut into a test piece of 70 μm thick, 43 mm wide and 180 mm long under the conditions of 60° C., 48 hours and a load of 100 g/cm$^2$, a tensile test was conducted at a stressing rate of 100 mm/mmn and 180° peel strength was determined. The higher the 180° peel strength, the worse the film blocking property.

It is apparent from Table 2 that the resin compositions of the present invention are excellent.

TABLE 1

| | Structure | Amount of polymer block B1 at one terminal (wt %) | Hydrogenation ratio (%) | Amount of styrene (wt %) | MFR (g/10 min) | 1,2-bond amount (mol %) | $\Delta$Tc (° C.) |
|---|---|---|---|---|---|---|---|
| SEBS 1 | B1-A-B2-A | 4.8 | 99.7 | 14.1 | 3.0 | 73.1 | 3.4 |
| SEBS 2 | B1-A-B2-A | 11.2 | 99.7 | 14.8 | 2.8 | 73.2 | 3.5 |
| SEBS 3 | B1-A-B2-A | 4.8 | 99.8 | 14.3 | 3.0 | 34.0 | 0.1 |
| SEBS 4 | B1-A-B2-A | 4.8 | 99.8 | 35.0 | 3.1 | 72.0 | 2.4 |
| SEBS 5 | A-B2-A | 0 | 99.7 | 9.2 | 14.1 | 72.3 | 3.7 |
| SEBS 6 | A-B2-A | 0 | 99.8 | 12.1 | 6.0 | 76.5 | 3.4 |
| SEBS 7 | B1-A-B2-A | 4.8 | 99.7 | 14.9 | 3.1 | 63.0 | 1.4 |

TABLE 2

| | | Ex. 1 | Comp. Ex. 1 | Comp. Ex. 2 | Comp. Ex. 3 | Comp. Ex. 4 | Comp. Ex. 5 | Ex. 2 | Comp. Ex. 6 |
|---|---|---|---|---|---|---|---|---|---|
| Composition | (1) Polypropylene resin | PC600S 80 parts by weight | PC600S 80 parts by weight | PC600S 80 parts by weight | PC600S 80 parts by weight | PC600S 80 parts by weight | PC600S 80 parts by weight | FG464 80 parts by weight | FG464 80 parts by weight |
| | (2) Hydrogenated block copolymer | SEBS1 20 parts by weight | SEBS2 20 parts by weight | SEBS3 20 parts by weight | SEBS4 20 parts by weight | SEBS6 20 parts by weight | SEBS7 20 parts by weight | SEBS1 20 parts by weight | SEBS5 20 parts by weight |
| Physical properties | Young's modulus (MD) (Kg/cm$^2$) | 4000 | 4400 | 5000 | 7000 | 4800 | 4500 | 3500 | 3500 |
| | Stress-whitening (%) | 4.8 | 5.2 | 33.3 | 190 | 16.0 | 14.0 | 1.0 | 1.1 |
| | Haze (%) | 48 | 6.3 | 16.9 | 19.5 | 13.0 | 9.0 | 2.3 | 2.5 |
| | Film blocking property (g/43 mm) | 5 | 25 | 8 | 5 | 8 | 6 | 9 | 40 |

Industrial Applicatbility

The resin compositions according to the present invention are excellent in the balance of flexibility, stress-whitening property, haze and film blocking property, which makes it possible to use them suitably for automobile interior materials, automobile outer materials, tubes, various containers, sheets, films and the like.

What is claimed is:

1. A resin composition comprising the following components (1) and (2):

(1) 5 to 99 parts by weight of a polypropylene resin, and (2) 1 to 95 parts by weight of a hydrogenated block copolymer which comprises at least two polymer blocks A each mainly comprising an aromatic vinyl hydrocarbon compound monomer unit and at least two hydrogenated polymer blocks B each mainly comprising a butadiene monomer unit, at least 90% of the olefinically unsaturated double bonds in said polymer block mainly comprising a butadiene monomer unit before hydrogenation having been hydrogenated, wherein at least one of the block at the terminal of the hydrogenated block copolymer is the polymer block B, wherein the proportion of the terminal polymer blocks B in the hydrogenated block copolymer is at least 0.1 wt % but less than 9.1 wt %, wherein the proportion of the aromatic vinyl hydrocarbon compound in the hydrogenated block copolymer exceeds 10 wt % but less than 25 wt %, wherein the 1,2-bond content of the polymer blocks mainly comprising a butadiene monomer unit before hydrogenation is, on average, at least 62 mol % but less than 99 mol %, and wherein the difference ΔTc (Tc1–Tc2) between the crystallization initiating temperature (Tc1) of an isotactic homopolypropylene and the crystallization initiating temperature (Tc2) of a mixture thereof with the hydrogenated block copolymer is at least 1.50° C.

wherein the amounts of components (1) and (2) are based on 100 parts by weight of both components (1) and (2).

2. The resin composition according to claim 1, wherein, in the component (2), the proportion of the aromatic vinyl hydrocarbon compound in the hydrogenated block copolymer is at least 12 wt % but less than 25 wt %.

3. The resin composition according to claim 1, wherein in the component (2), ΔTc (Tc1–Tc2) is at least 2.0° C.

4. The resin composition according to claim 1, wherein, in the component (2), the proportion of the terminal polymer block B in the hydrogenated block copolymer exceeds 0.5 wt % but less than 5.0 wt %.

5. A sheet and film comprising the resin composition as claimed in claim 1.

* * * * *